(12) United States Patent
Cherukuri (10) Patent No.: US 10,002,202 B2
(45) Date of Patent: Jun. 19, 2018

(54) REALTIME WEBSITES WITH PUBLICATION AND SUBSCRIPTION

(75) Inventor: Ravikant Cherukuri, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1376 days.

(21) Appl. No.: 12/789,487

(22) Filed: May 28, 2010

(65) Prior Publication Data

US 2011/0296050 A1 Dec. 1, 2011

(51) Int. Cl.
*G06F 17/30* (2006.01)
*H04L 29/08* (2006.01)

(52) U.S. Cl.
CPC ........ *G06F 17/30893* (2013.01); *H04L 67/02* (2013.01)

(58) Field of Classification Search
CPC .... G06F 15/16; G06F 9/542; G06F 17/30979; G06F 9/4428; G06F 9/541; G06F 17/30286; G06F 17/30557; G06F 17/30575; G06F 17/30864; G06F 17/30893; G06F 17/30899; G06F 9/54; G06F 11/3495; G06F 17/30085; G06F 17/30312; G06F 17/30356; G06F 17/30368; G06F 17/30386; G06F 17/30442; G06F 17/30448; G06F 17/30516; G06F 17/3056; G06F 17/30867; G06F 17/3087; G06F 17/30876; G06F 17/30902; G06F 19/322; G06F 19/325; G06F 19/327; G06F 19/328; G06F 21/6254; G06F 21/6263; G06F 8/34; G06F 8/38; G06F 9/4435; G06F 9/4436; G06F 9/4443; G06F 9/543; G06F 9/546; H04L 67/02; H04L 67/26; H04L 67/2809; H04L 69/329; H04L 29/06; H04L 67/12; H04L 67/322;
(Continued)

(56) References Cited

U.S. PATENT DOCUMENTS 6,449,618 B1 * 9/2002 Blott et al.
6,735,586 B2 * 5/2004 Timmons
(Continued)

FOREIGN PATENT DOCUMENTS

WO 2009080096 A1 7/2009

OTHER PUBLICATIONS

Henshaw-Plath, et al., "Beyond REST? Building Data Services with XMPP PubSub", Retrieved at << http://www.oscon.com/oscon2008/public/schedule/detail/4359 >>, Jul. 23, 2008.
(Continued)

*Primary Examiner* — Greg C Bengzon
(74) *Attorney, Agent, or Firm* — Davin Chin; Chin IP, PLLC (57) ABSTRACT

Architecture that utilizes a long poll publication/subscription (pubsub) model for updating realtime objects of a webpage. Each realtime-enabled object is a pubsub entity in a pubsub service. Each rendering of the webpage creates a subscription on a page object. The entity in the pubsub service enables the realtime communications of content to the webpage object. The architecture provides light-weight realtime anonymous pubsub at scale, a light-weight pubsub that can scale to the web on the backend, and integration into existing website code by plugging in at the javascript level.

19 Claims, 10 Drawing Sheets

(58) Field of Classification Search
CPC ... H04L 67/18; H04L 67/306; H04L 12/2602; H04L 2463/102; H04L 29/06027; H04L 41/0233; H04L 41/0266; H04L 41/0273; H04L 41/028; H04L 43/00; H04L 63/0428; H04L 63/08; H04L 63/20; H04L 65/1006; H04L 65/1069; H04L 65/1096; H04L 65/60; H04L 65/80; H04L 67/00; H04L 67/04; H04L 67/08; H04L 67/16; H04L 67/20; H04L 67/22; H04L 67/28; H04L 67/2851; H04L 67/303; H04L 67/325; H04L 67/38; H04L 69/24; H04W 8/18; H04W 8/24; H04W 24/00; H04W 4/02; H04W 16/22; H04W 28/18; H04W 4/00; H04W 4/18; H04W 4/206; H04W 8/10; H04W 8/20

See application file for complete search history.

(56) References Cited

U.S. PATENT DOCUMENTS

| | | | | |
|---|---|---|---|---|
| 6,981,214 | B1* | 12/2005 | Miller | G06F 17/30867 705/14.61 |
| 7,383,253 | B1* | 6/2008 | Tsimelzon | G06F 17/30516 707/610 |
| 7,487,260 | B2 | 2/2009 | Dorai et al. | |
| 7,694,272 | B2* | 4/2010 | Bronicki et al. | 717/109 |
| 7,823,166 | B2* | 10/2010 | Wu | G06F 17/2247 709/242 |
| 7,882,253 | B2* | 2/2011 | Pardo-Castellote | H04L 29/06 709/224 |
| 7,917,538 | B2* | 3/2011 | Gurevich | 707/802 |
| 8,065,411 | B2* | 11/2011 | Spiess et al. | 709/224 |
| 8,108,429 | B2* | 1/2012 | Sim-Tang et al. | 707/790 |
| 8,150,988 | B2* | 4/2012 | Pardo-Castellote et al. | 709/230 |
| 8,190,646 | B2* | 5/2012 | Laxminarayanan | 707/792 |
| 8,200,700 | B2* | 6/2012 | Moore et al. | 707/791 |
| 8,200,775 | B2* | 6/2012 | Moore | 709/217 |
| 8,400,961 | B1* | 3/2013 | Islam | H04W 8/24 370/328 |
| 9,317,612 | B1* | 4/2016 | Camplejohn | G06F 17/30867 |
| 2002/0037722 | A1* | 3/2002 | Hussain | G06F 17/3087 455/435.1 |
| 2002/0090932 | A1* | 7/2002 | Bhatia | G06F 17/3087 455/412.1 |
| 2002/0165903 | A1 | 11/2002 | Zargham et al. | |
| 2002/0178273 | A1 | 11/2002 | Pardo-Castellote et al. | |
| 2003/0177187 | A1* | 9/2003 | Levine et al. | 709/205 |
| 2004/0019688 | A1* | 1/2004 | Nickerson | G06F 17/3089 709/229 |
| 2005/0050021 | A1* | 3/2005 | Timmons | 707/3 |
| 2005/0108418 | A1* | 5/2005 | Bedi | G06F 17/30902 709/232 |
| 2005/0119913 | A1* | 6/2005 | Hornreich | G06Q 50/22 705/2 |
| 2006/0089941 | A1* | 4/2006 | Jenni et al. | 707/102 |
| 2006/0117035 | A1* | 6/2006 | Stewart | G06F 17/3089 |
| 2006/0184617 | A1* | 8/2006 | Nicholas | G06Q 30/02 709/203 |
| 2006/0259462 | A1* | 11/2006 | Timmons | 707/3 |
| 2006/0265427 | A1* | 11/2006 | Cohen | G06F 17/30038 |
| 2007/0038567 | A1* | 2/2007 | Allaire | G06Q 30/0239 705/50 |
| 2007/0124416 | A1* | 5/2007 | Casey | H04L 67/26 709/217 |
| 2007/0192325 | A1* | 8/2007 | Morris | H04L 67/24 |
| 2007/0266093 | A1* | 11/2007 | Forstall | G06F 9/4443 709/204 |
| 2007/0282973 | A1* | 12/2007 | Chapman | H04M 3/537 709/217 |
| 2007/0299681 | A1* | 12/2007 | Plastina | G06Q 30/02 705/51 |
| 2007/0299737 | A1* | 12/2007 | Plastina | G06Q 30/0207 705/14.1 |
| 2008/0021874 | A1* | 1/2008 | Dahl et al. | 707/3 |
| 2008/0059631 | A1* | 3/2008 | Bergstrom | H04N 7/17318 709/224 |
| 2008/0077653 | A1* | 3/2008 | Morris | G06F 17/30896 709/203 |
| 2008/0106600 | A1* | 5/2008 | Benco | H04L 67/2823 348/157 |
| 2008/0109481 | A1* | 5/2008 | Catanzariti | G06F 17/30867 |
| 2008/0140674 | A1* | 6/2008 | Ishikawa | G06F 17/30867 |
| 2009/0089294 | A1* | 4/2009 | Davis et al. | 707/10 |
| 2009/0248883 | A1* | 10/2009 | Suryanarayana | G06F 9/4443 709/229 |
| 2010/0083124 | A1* | 4/2010 | Druzgalski | G06F 17/3087 715/738 |
| 2010/0250677 | A1* | 9/2010 | Kahan | H04L 12/1859 709/204 |
| 2010/0281107 | A1* | 11/2010 | Fallows et al. | 709/203 |
| 2011/0047475 | A1* | 2/2011 | Wu | G06F 17/2247 715/744 |
| 2011/0126213 | A1* | 5/2011 | Macken | G06F 9/4445 719/313 |
| 2011/0179050 | A1* | 7/2011 | Parsons et al. | 707/755 |
| 2011/0208810 | A1* | 8/2011 | Li et al. | 709/203 |
| 2011/0282921 | A1* | 11/2011 | Dodge | G06F 9/542 707/822 |
| 2012/0047176 | A1* | 2/2012 | Timmons | 707/780 |
| 2012/0131139 | A1* | 5/2012 | Siripurapu et al. | 709/217 |
| 2012/0311082 | A1* | 12/2012 | Munson et al. | 709/217 |
| 2016/0343037 | A1* | 11/2016 | Nicholas | G06Q 30/02 |

OTHER PUBLICATIONS

Joshi, Rajive., "Building a Effective Real-Time Distributed Publish-Subscribe Framework Part 1", Retrieved at << http://www.com-msdesign.com/design_corner/showArticle.jhtml?articleID=191901837 >>, Aug. 9, 2006.

"RabbitMQ—Messaging that Just Works", Retrieved at << http://www.rabbitmq.com/resources/RabbitMQ_Introduction.pdf >>, Oct. 2009.

Chandramouli, et al., "ProSem: Scalable Wide-Area Publish/Subscribe", Retrieved at << http://www.cs.duke.edu/dbgroup/papers/2008-SIGMOD-cyayz-prosemdemo.pdf >>, Jun. 9-12, 2008, International Conference on Management of Data, Proceedings of the 2008 ACM SIGMOD international conference on Management of data, Jun. 9-12, 2008.

Almadani, Basem., "RTPS Middleware for Real-Time Distributed Industrial Vision Systems", Retrieved at << http://www.omgwiki.org/dds/sites/default/files/Almadani-RTPS4RTDIVS.pdf >>, RTCSA, Proceedings of the 11th IEEE International Conference on Embedded and Real-Time Computing Systems and Applications, Aug. 17-19, 2005.

"Nirvana Web-based Messaging", Retrieved at << http://www.my-channels.com/products/nirvana/web/ >>, Retrieved Date: Mar. 22, 2010.

* cited by examiner

REALTIME WEBSITES WITH PUBLICATION AND SUBSCRIPTION

BACKGROUND

Realtime websites are a growing category of websites that update the user experience as the real-world data changes with sub-second delays. The design of realtime websites is a complex endeavor, especially at a large scale. The complexity is elevated when converting an existing website to a realtime enabled site.

In a realtime webpage, one part can update with the latest information independent of another part, thereby providing the capability to the user interface to apply updates independently as events happen. Webpages that need realtime updates traditionally use a timer-based polling technique that is difficult to scale to millions of users.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture utilizes a long poll publication/subscription (pubsub) model, which is a light-weight alternative to existing solutions that removes the complexity of providing a realtime website. Each realtime-enabled component (object) of a webpage is a pubsub entity in a pubsub service. Each rendering of the page creates a subscription on a page object. The entity in the pubsub service enables the realtime communications of content to the webpage object.

The architecture provides light-weight realtime anonymous pubsub at scale, a light-weight pubsub that can scale to the web on the backend, and integration into existing website code by plugging in at the javascript level.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The problem of building realtime websites can be mapped to a publish-subscribe (pubsub) model. Each realtime website has one or more components that need to update independently in realtime when a data item that is displayed changes. If each of these data items is an entity in a pubsub service, each rendered part of the webpage will need to subscribe to this entity. Then a change can be published to this entity, which then fans the change out to all subscribed web pages.

Publish/subscribe is a messaging paradigm where senders (publishers) of messages are not programmed to send messages to specific receivers (subscribers). Rather, published messages are characterized into classes, without knowledge of what (if any) subscribers there may be. Subscribers express interest in one or more classes, and only receive messages that are of interest, without knowledge of what (if any) publishers there are. This decoupling of publishers and subscribers can allow for greater scalability and a more dynamic network topology.

Long polling is a variant of traditional polling techniques. The client requests information from the server; however, if the server does not have information available, the server holds the request and waits for some information to be available (and does not send an empty response). Once the information becomes available (or after a suitable timeout), the server sends a complete response to the client. The client will normally then immediately "park" another request for information on the server.

The disclosed architecture implements a realtime website using a pubsub model. Each realtime-enabled component of the web page has a pubsub entity in a pubsub service. Each rendering of the page creates a subscription on this object. The object in a pubsub service enables the realtime communications.

This model makes it simple for the participating webpage. The pubsub service handles the realtime long poll connection from the browser for pushing notification, keeps track of the currently rendered instances of the webpage and performs the fanout. These are the more difficult and expensive parts of being a realtime service.

Messaging systems (e.g., instant messaging) solve the pubsub problem for presence on a large scale, and also provide browser-based connectivity using long poll. The disclosed architecture leverages and extends this approach at the web scale.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
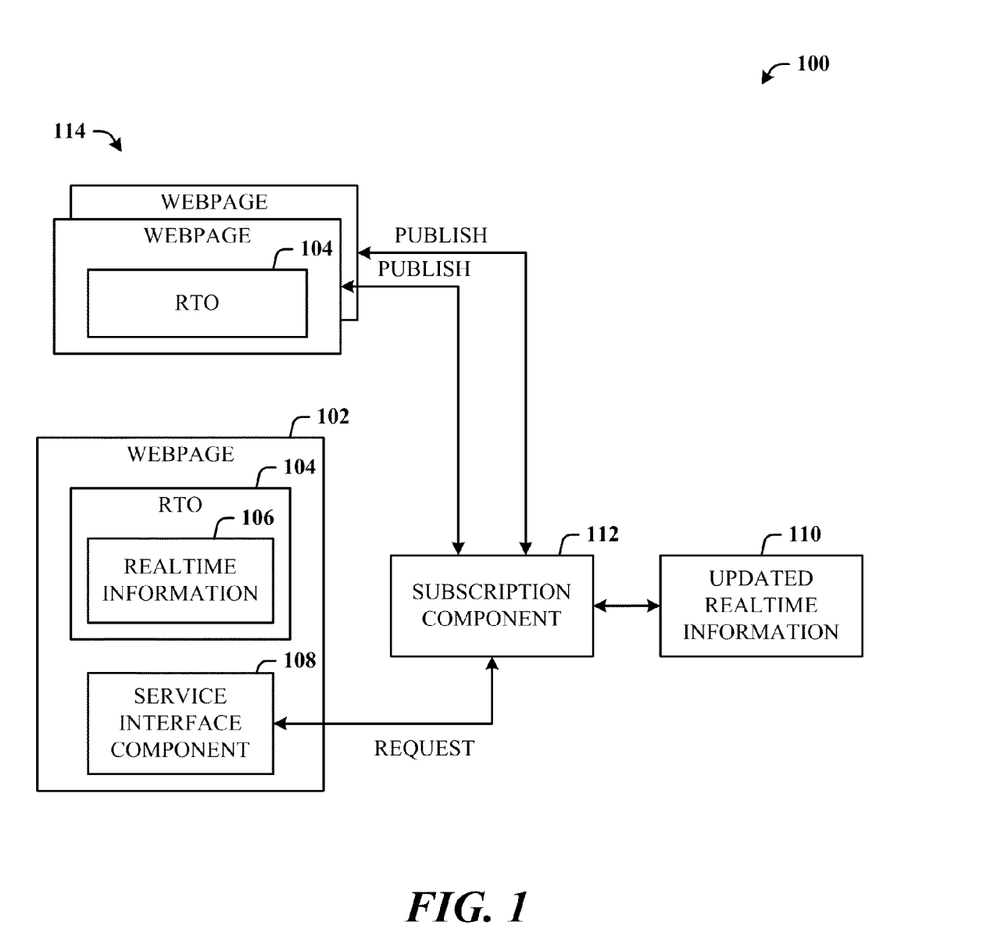
FIG. 1 illustrates a realtime webpage system in accordance with the disclosed architecture.

FIG. 1 illustrates a realtime webpage system 100 in accordance with the disclosed architecture. The system 100 comprises a webpage 102 that includes a realtime object (RTO) 104 that presents realtime information 106. A service interface component 108 included (inserted) as part of the webpage 102 sends a request for updated realtime information 110 for the realtime object 104. A subscription component 112 (the pubsub service) receives and processes the request and sends the updated realtime information 110 to the realtime object 104.

The subscription component 112 maps the realtime object 104 of the webpage 102 to an entity of the subscription component 112 and publishes the updated realtime information 110 to the webpage 102 as a subscriber to the entity. The subscription component 112 maintains mappings of multiple other webpages 114 as other subscribers to the entity and publishes the updated realtime information 110 to associated realtime objects of the other webpages 114. The realtime object 104 can be one of many realtime objects of the webpage 102 that are tagged and registered to the subscription component 112 to receive corresponding published updated realtime information (e.g., different form the updated realtime information 110).

The realtime object 104 has associated serialize and deserialize plug-ins, the serialize plug-in handles publishing of updates from the webpage 102 to the subscription component 112 and the deserialize plug-in applies the updated realtime information 110 published from the subscription component 112.

The system 100 can further comprise a long poll manager that maintains a session connection between the webpage 102 and the subscription component 112 such that the service interface component 108 makes calls to the subscription component 112 for subscriptions and the subscription component 112 sends notifications to the service interface component 108. The subscription component 112 authenticates registration of a website that hosts the webpage 102 and entities allocated to realtime objects of the website. The subscription component 112 throttles subscriptions to limit concurrent browser instances for realtime object update and throttles publish rate for an entity. The subscription component 112 applies publish fanout to other webpages (e.g., the other webpages 114) that include the realtime object 104 based on a service level agreement.

Figure 2:
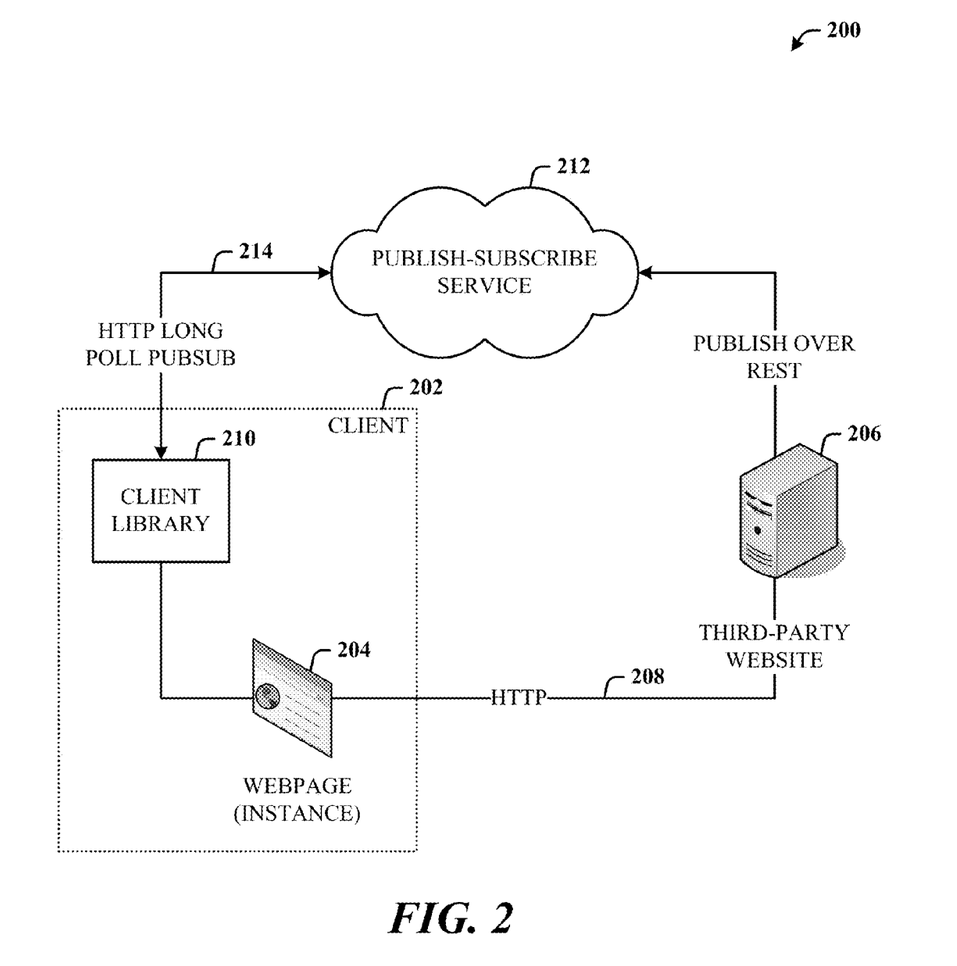
FIG. 2 illustrates a flow block diagram of an exemplary realtime website pubsub system.

FIG. 2 illustrates a flow block diagram of an exemplary realtime website pubsub system 200. A client system 202 includes a browser application that opens a webpage 204 (e.g., webpage 102) from a third party website 206 via a connection 208 (e.g., HTTP-hypertext transport protocol). The webpage 204 includes a realtime object (e.g., realtime object 104) that receives and presents realtime information dynamically. The webpage 204 is associated with a client library 210 (e.g., the service interface component 108) received from a pubsub service 212 (e.g., the subscription component 112).

The pubsub service 212 installs the library 210 (e.g., JavaScript) that is then embedded on each realtime-enabled webpage of the website 206. The library 210 includes the identities of the realtime components (e.g., realtime object 104) on the webpage 204. The website 206 also implements serialize and deserialize plug-ins to the realtime components on the webpage 204. The plug-ins handle the publishing of updates from the webpage 204 to the pubsub service 212 and application of the updates received from the pubsub service 212 into the webpage 204.

The client library 210 in association with the pubsub service 212 facilitates ease of use for the realtime website developer. The client library 210 can be employed in the HTML (hypertext markup language) of the webpage 204.

On load of the webpage 204, the library 210 registers with the pubsub service 212 and the pubsub service 212 then allocates a predetermined number of entities for the website 206. The webpage 204 creates a long-poll polling connection 214 to the pubsub service 212 and subscribes to the entities in the service. When data changes on the service 212 for this entity, the client library 210 invokes the deserialize plug-in that renders the update via the associated realtime component.

Figure 3:
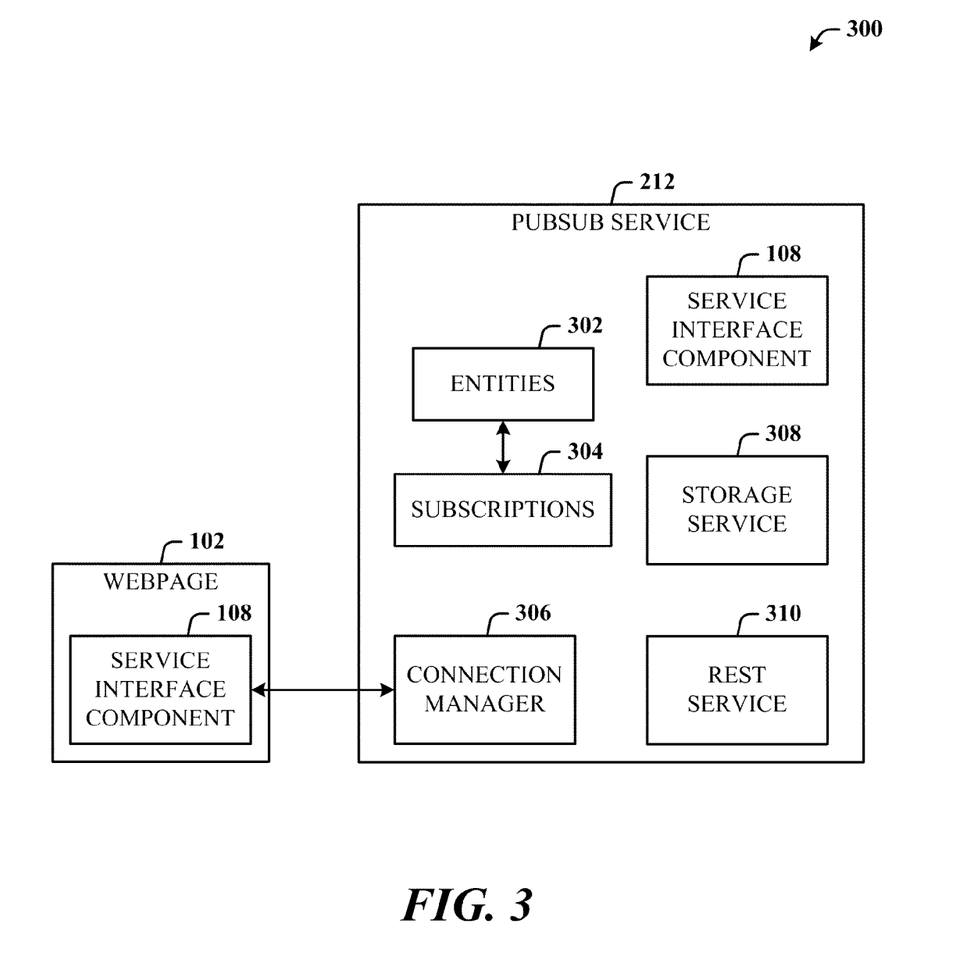
FIG. 3 illustrates a pubsub system that details an embodiment of the pubsub service.

FIG. 3 illustrates a pubsub system 300 that details an embodiment of the pubsub service 212. The pubsub service 212 stores an in-memory cache of entities 302 and the subscriptions 304 to these entities 302. The service 212 handles the following aspects: authentication of the creation of the entities 302 by ensuring that only registered websites are allowed subscription and the allocated entities for the website are within predetermined website quotas; subscription throttling, which limits the number of concurrent browser instances that can be realtime processed; throttling on publish rate, to ensure that each entity is not overburdened with requests; and, realtime SLA (service level agreement) management to publish request fanout to other websites (webpages).

The realtime pubsub service 212 can include several components: the service interface component 108 (e.g., the client library 210), which can be a JavaScript API (application programming interface) that the pubsub service 212 installs on a realtime website and which the website employs to implement pubsub for associated website webpages, a long-poll connection manager 306 that the service interface component 108 of the webpage calls into to make subscriptions and receive notifications, a pubsub state storage service 308 that stores topics, subscriptions, and limited amount of state, and a REST (representational state transfer) service 310 that receives requests to publish on topics. (REST is a client/server software architecture for distributed hypermedia systems where hypertext and hyper links interact to create non-linear information medium.)

With respect to the service interface component 108, a participating webpage includes components (objects) that need realtime updates and other components that do not. On webpage load, the webpage registers its realtime objects (components) to the pubsub service 212 with callback handlers. Following is an example service interface component.

```
<html xmlns="http://www.w3.org/1999/xhtml" >
<head>
<script type="text/javascript"
        src="http://pubsub.service.com/js/pubsub.js" />
<script type="text/javascript">
    function OnLoad( )
    {
        PubSub.Register("rt1", "rt1-topic", OnSerialize1,
OnDeserialize1);
        PubSub.Register("rt2", "rt2-topic", OnSerialize2,
OnDeserialize2);
    }
    function OnSerialize1(data) {
    ...
    }
    function OnSerialize2(data) {
    ...
    }
    function OnDeserialize1(data) {
    ...
    }
```

```
            function OnDeserialize2(data) {
              ...
            }
          </script>
        </head>
        <body>
          <div id="rt1">...</div>
          <div id="rt2">...</div>
        </body>
      </html>
```

In the context of using JavaScript, a callback handler receives data in a JSON (JavaScript object notation) representation (a light-weight interchange format) of ATOM format (an HTTP-based protocol for creating and updating web resources). The application (e.g., browser) renders the realtime change that is received. The change can be an HTML snippet that comes in a notification and that will replace the content of an HTML <div> tag, for example, or an update that causes a more subtle change to the user experience.

The long poll connection manager 306 maintains the polling sessions from the webpages that use the pubsub service interface component 108. On a first request, the connection manager adds a subscription to a topic (described herein below) on the backend (pubsub storage) service 308. The long poll connection manager 306 maintains the mapping between a session id (that identifies the subscription) and the polling HTTP connection. The service interface component code (installed on the client) "parks" an HTTP request on the connection manager 306. This is an HTTP request to which the connection manager 306 responds only when there is update data to be delivered to the subscriber (or after a timeout so as to enable the client code to detect broken TCP connections).

The state storage service 308 is implemented as a distributed datastore indexed by the topic. The storage service 308 receives subscription add and remove requests from the long-poll connection manager 306 and publishes requests from the REST service 310. On receiving a subscription add/remove request, the storage service 308 adds or removes a subscription on the topic object. A list of subscriptions is maintained on the topic object. When a publish request is received from the REST service 310, the pubsub service 212 looks up the topic and sends the notification to all the registered subscribers.

The REST service 310 implements an HTTP endpoint that publishers call to publish data. The REST service 310 forwards the publish request to the pubsub service 212 for fanout to the subscribers.

Figure 4:
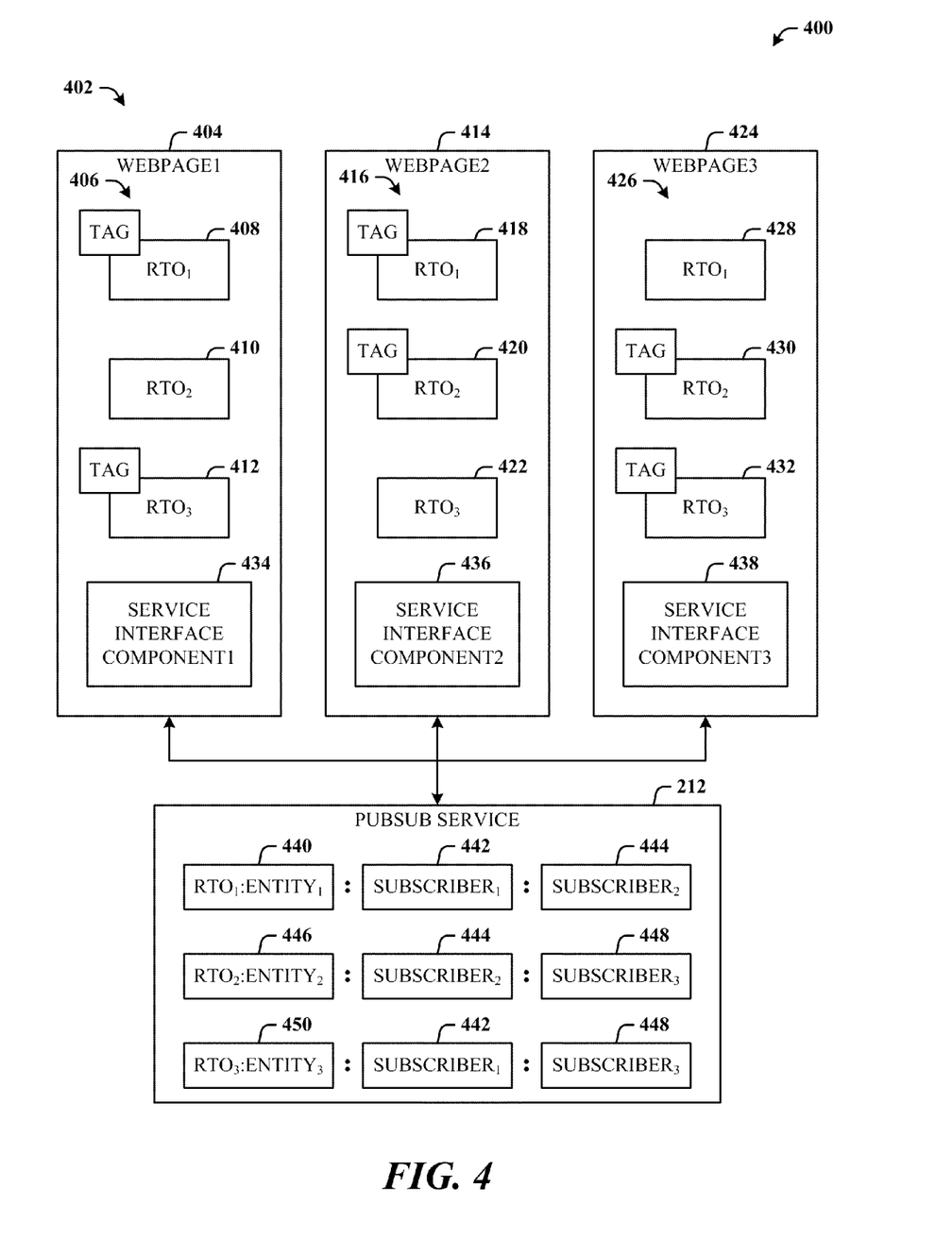
FIG. 4 illustrates a system where the pubsub service publishes realtime information to subscribing webpages.

FIG. 4 illustrates a system 400 where the pubsub service 212 publishes realtime information to subscribing webpages 402. Here, three webpages 402 have loaded and registered to the pubsub service 212. A first webpage 404 includes three realtime objects 406: a first RTO 408 tagged for realtime information update, a second RTO 410 not tagged for update, and a third RTO 412 tagged for realtime update. Similarly, a second webpage 414 includes three realtime objects 416: a first RTO 418 (same object as first RTO 408) tagged for realtime information update, a second RTO 420 (same object as second RTO 410) tagged for update, and a third RTO 422 (same object as third RTO 412) not tagged for realtime update. A third webpage 424 includes three realtime objects 426: a first RTO 428 (same object as first RTO 408) not tagged for realtime information update, a second RTO 430 (same object as second RTO 410) tagged for update, and a third RTO 432 (same object as third RTO 412) tagged for realtime update.

The first webpage 404 includes a first service interface component 434 (similar to interface component 108) that establishes communications with and registers the first RTO 408 and third RTO 412 to the pubsub service 212 for realtime information update. Similarly, the second webpage 414 includes a second service interface component 436 (similar to interface component 108) that establishes communications with and registers the first RTO 418 and second RTO 420 to the pubsub service 212 for realtime information update. The third webpage 424 includes a third service interface component 438 (similar to interface component 108) that establishes communications with and registers the second RTO 430 and third RTO 432 to the pubsub service 212 for realtime information update.

The pubsub service 212 then creates and allocates entities to the subscribing webpages. For example, a first entity 440 is created and allocated for the first RTO 408, and mapped to a first subscriber 442 (for the first webpage 404) and a second subscriber 444 (for the second webpage 414). Similarly, a second entity 446 is created and allocated for the second RTO 420, and mapped to the second subscriber 444 (for the second webpage 414) and a third subscriber 448 (for the third webpage 424). A third entity 450 is created and allocated for the third RTO 412, and mapped to the first subscriber 442 (for the first webpage 404) and the third subscriber 448 (for the third webpage 424).

Thus, a realtime update received at the pubsub service 212 for the first RTO 408 is passed to the first entity 440 and fanned out therefrom to the first and second subscribers (442 and 444). A realtime update received at the pubsub service 212 for the second RTO 420 is passed to the second entity 446 and fanned out therefrom to the second and third subscribers (444 and 448). A realtime update received at the pubsub service 212 for the third RTO 412 is passed to the third entity 450 and fanned out therefrom to the first and third subscribers (442 and 448).

As previously described, it is also possible for the an update to be made to the second RTO 410 of the first webpage 404, the update published by the first service interface component 434 to the pubsub service 212, where the change is then passed to the second entity 446 for fanout by the pubsub service 212 to the second and third subscribers (444 and 448).

Figure 5:
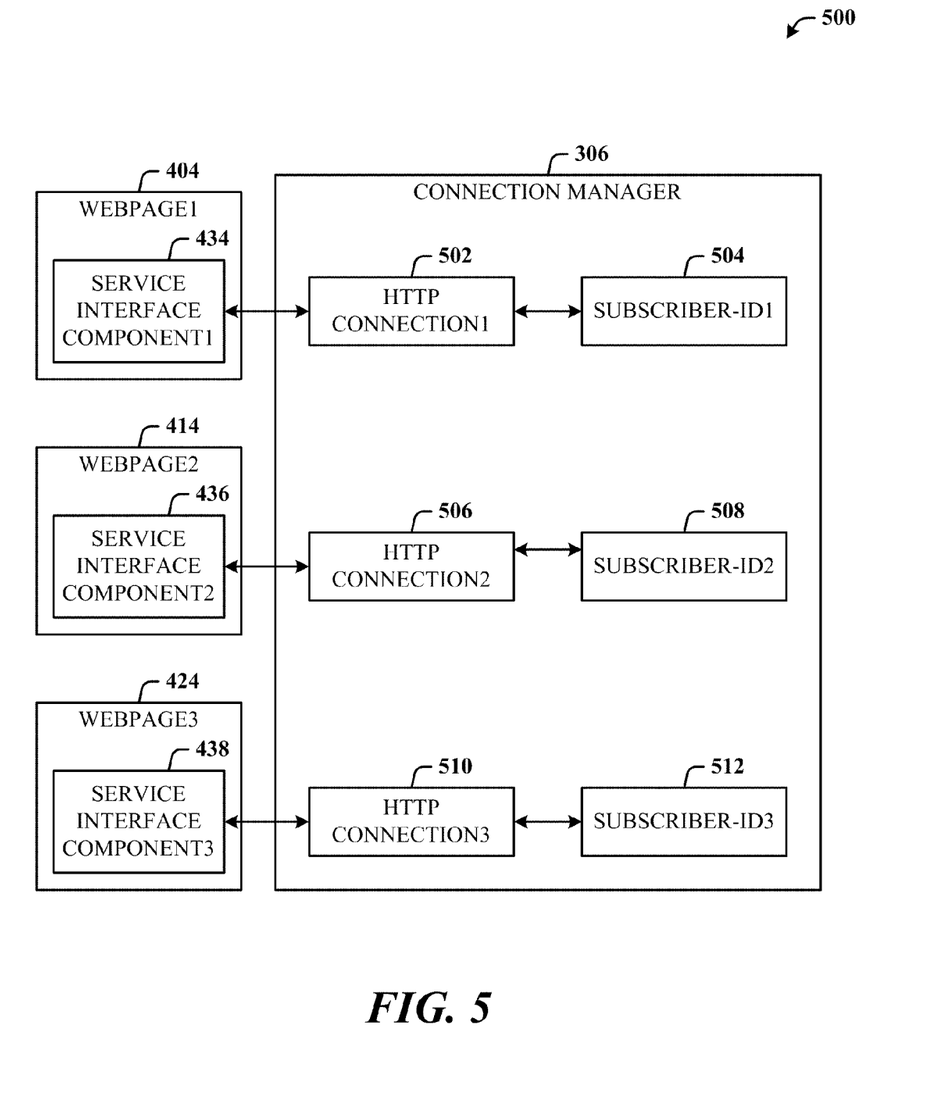
FIG. 5 illustrates a system of connection management of sessions by the connection manager.

FIG. 5 illustrates a system 500 of connection management of sessions by the connection manager 306. The connection manager 306 established the connections between the webpages that host the service interface components. Here, the three webpages 402 of FIG. 4 each are provide individual HTTP connections: a first connection 502 is mapped to subscriber information 504 (similar to information of the first subscriber 442 of FIG. 4) of the first webpage 404, a second connection 506 is mapped to subscriber information 508 (similar to information of the second subscriber 444 of FIG. 4) of the second webpage 414, and a third connection 510 is mapped to subscriber information 512 (similar to information of the third subscriber 448 of FIG. 4) of the third webpage 424. The connections are established and dropped as the webpages load and are unloaded.

Figure 6:
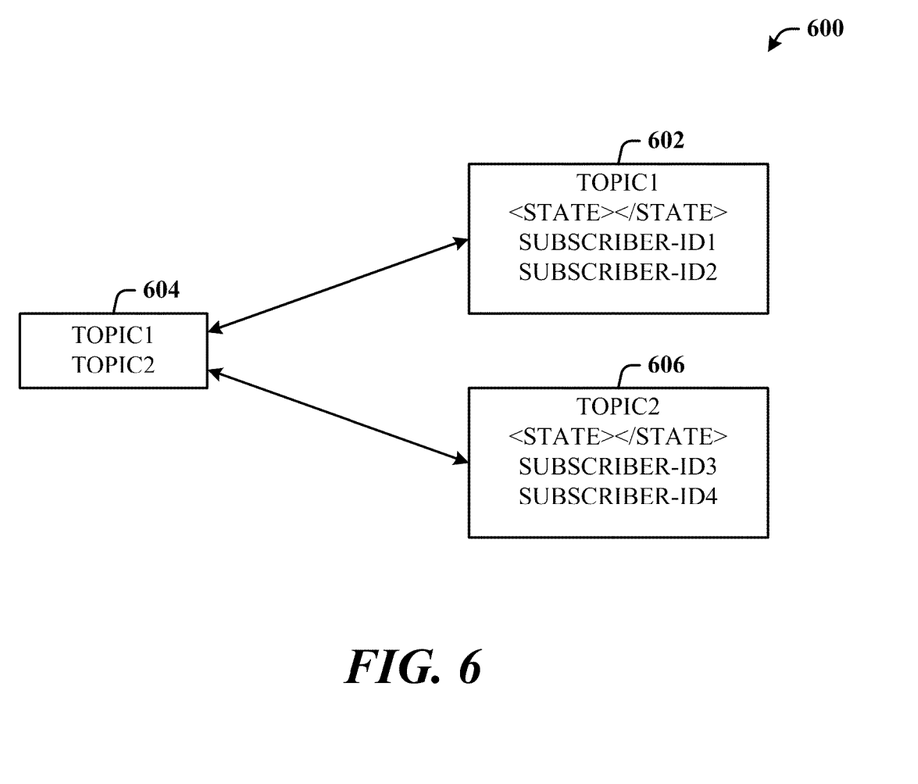
FIG. 6 illustrates the use of topics as entities to which subscribers are mapped for realtime information update of realtime objects.

FIG. 6 illustrates the use of topics 600 as entities to which subscribers are mapped for realtime information update of realtime objects. Topics are entities that identify publisher channels (e.g., the connections of FIG. 5). The publishers and subscribers identify the channel of communications being referenced by the topic. For example, if a group of subscribers is interested in a blog, the blog's URL can be the topic and the publisher identifies the blog by its URL when publishing information.

Here, a first topic 602 includes state information, as well as subscriber identifiers (e.g., subscriber 442, subscriber information 504) that map to a topic index. Similarly, a second topic 606 includes state information, as well as subscriber identifiers (e.g., subscriber 448, subscriber information 512) that map to the topic index 604.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
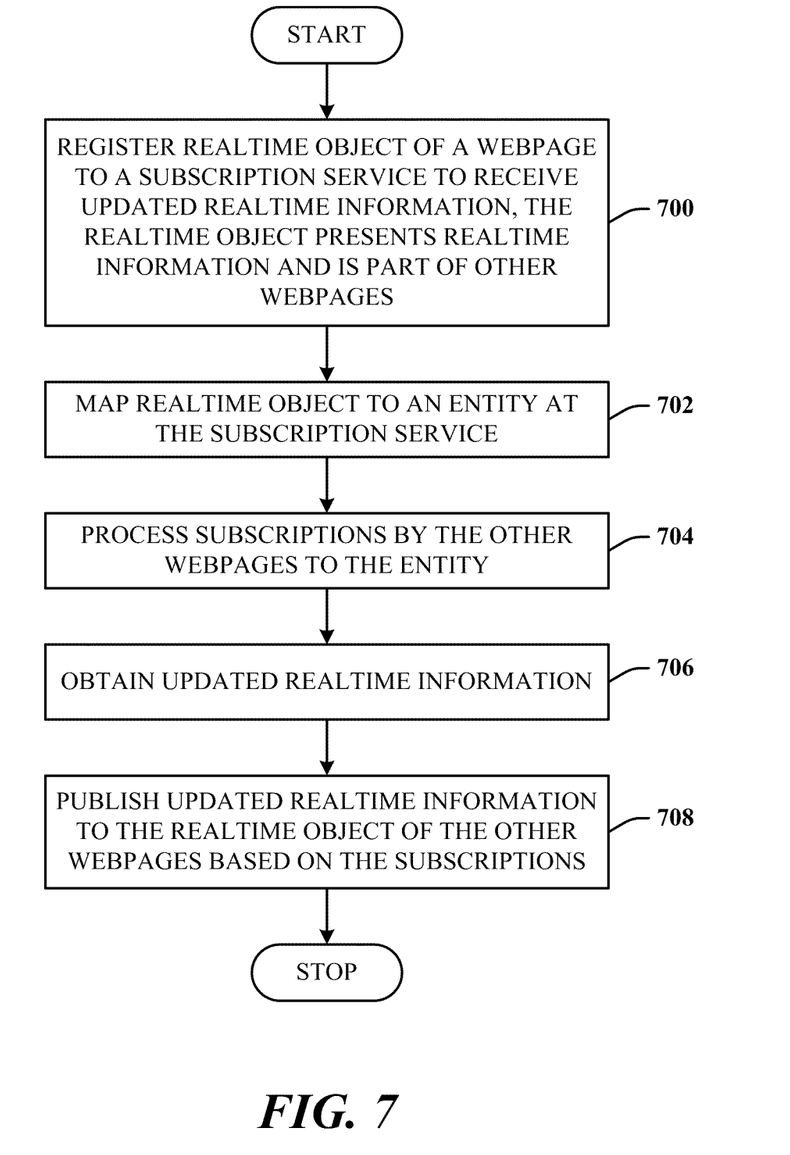
FIG. 7 illustrates a computer-implemented realtime webpage method in accordance with the disclosed architecture.

FIG. 7 illustrates a computer-implemented realtime webpage method in accordance with the disclosed architecture. At 700, a realtime object of a webpage is registered to a subscription service to receive updated realtime information. The realtime object presents realtime information and is part of other webpages. At 702, the realtime object is mapped to an entity at the subscription service. At 704, subscriptions are processed by the other webpages to the entity. At 706, the updated realtime information is obtained. At 708, the updated realtime information is published to the realtime object of the other webpages based on the subscriptions.

Figure 8:
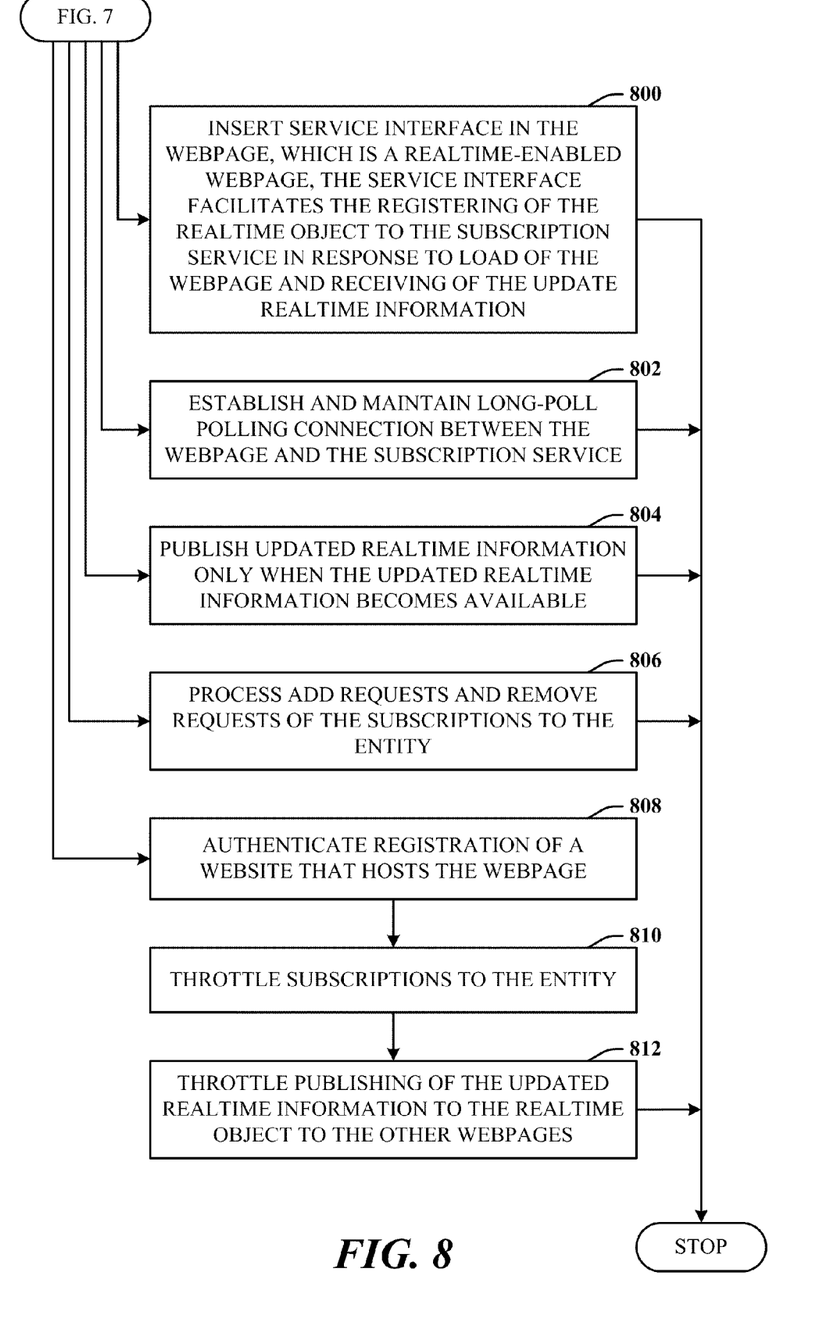
FIG. 8 illustrates further aspects of the method of FIG. 7.

FIG. 8 illustrates further aspects of the method of FIG. 7. At 800, a service interface is inserted in the webpage, which is a realtime-enabled webpage. The service interface facilitates the registering of the realtime object to the subscription service in response to load of the webpage and receiving of the update realtime information. At 802, a long-poll polling connection is established and maintained between the webpage and the subscription service. At 804, the updated realtime information is published only when the updated realtime information becomes available. At 806, add requests and remove requests of the subscriptions to the entity are processed. At 808, registration of a website that hosts the webpage is authenticated. At 810, subscriptions to the entity are throttled. At 812, publishing of the updated realtime information to the realtime object is throttled to the other webpages.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
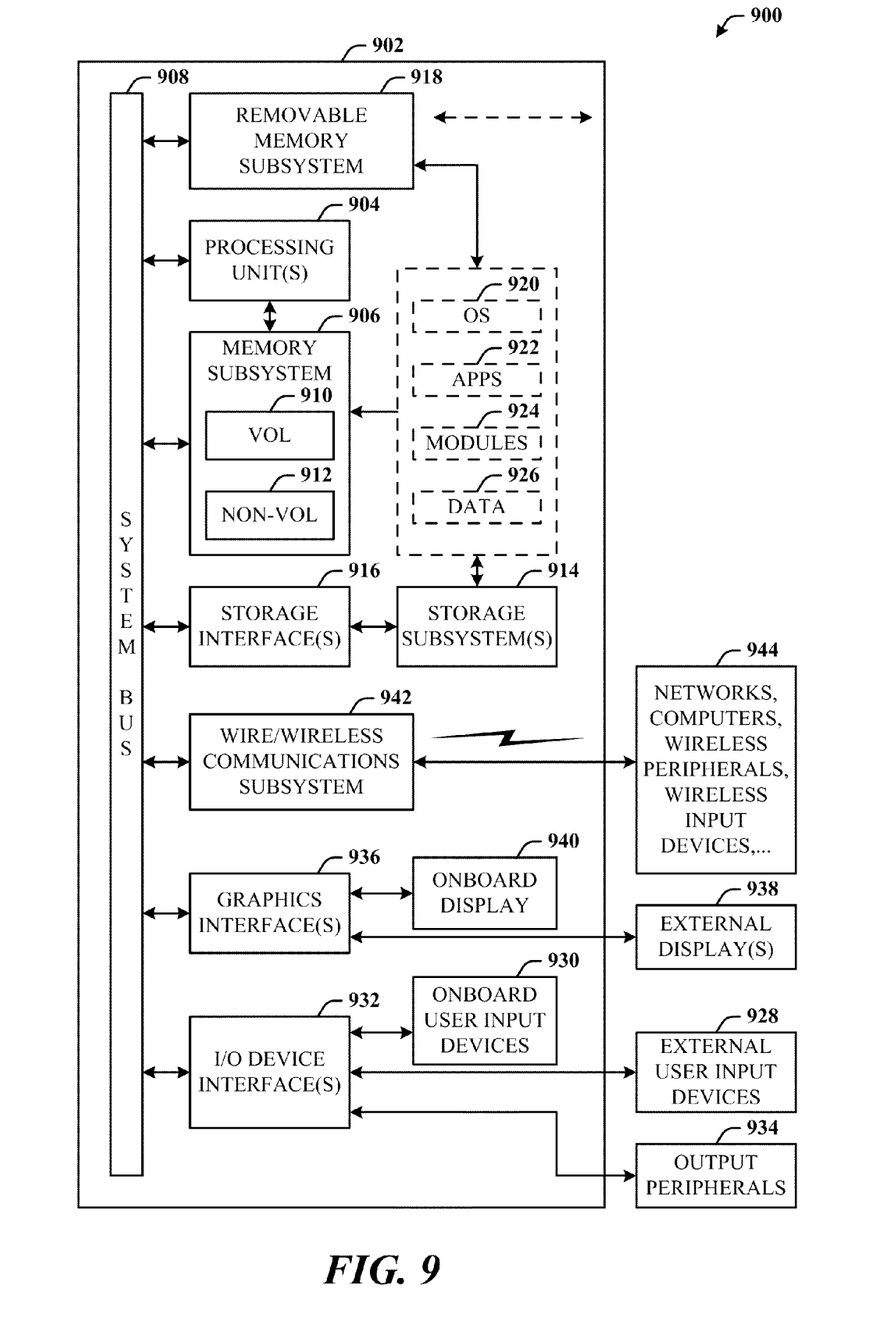
FIG. 9 illustrates a block diagram of a computing system that executes realtime object updates using a pubsub service in accordance with the disclosed architecture.

Referring now to FIG. 9, there is illustrated a block diagram of a computing system 900 that executes realtime object updates using a pubsub service in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can be employed for use in the pubsub service 212 (also subscription component 112) or a client computing system for each webpage client. As appropriately employed, the one or more application programs 922, other program modules 924, and program data 926 can include the entities and components of the system 100 of FIG. 1, the entities, components, and flow of the system 200 of FIG. 2, the entities and components of the system 300 of FIG. 3, the entities and components of the system 400 of FIG. 4, the entities and components of the system 500 of FIG. 5, the topic entities of FIG. 6, and the methods represented by the flowcharts of FIGS. 7 and 8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

Figure 10:
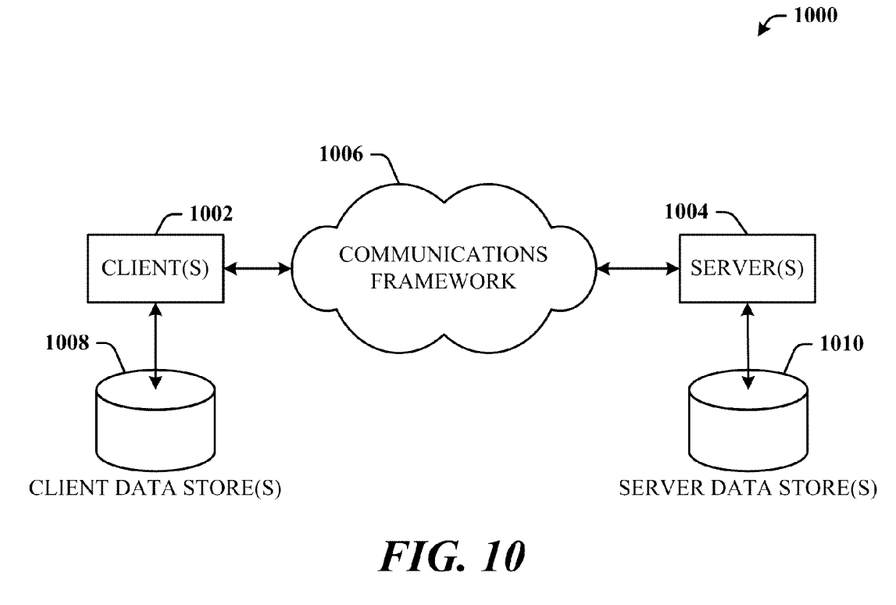
FIG. 10 illustrates a schematic block diagram of a computing environment that utilizes pubsub services for realtime webpage object updates.

Referring now to FIG. 10, there is illustrated a schematic block diagram of a computing environment 1000 that utilizes pubsub services for realtime webpage object updates. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device for rendering realtime webpages, the computing device comprising:
   a memory and a processor that are respectively configured to store and execute instructions that:
      render a realtime webpage, the realtime webpage including:
         a service interface component included as a part of the realtime webpage, wherein the service interface component is adapted to send a request for realtime information to a subscription component for processing; and
         a realtime object included as another part of the realtime webpage, wherein the realtime object is adapted to receive realtime information from the subscription component in response to the request from the service interface component.

2. The system of claim 1, wherein the subscription component is adapted to map the realtime object of the realtime webpage to an entity of the subscription component and to provide the realtime information to the realtime object.

3. The system of claim 2, wherein the subscription component is also adapted to maintain mappings of multiple other realtime objects as other subscribers to the entity and to provide the realtime information to the other realtime objects.

4. The system of claim 1, wherein the realtime object is one of multiple realtime objects of the realtime webpage that are individually tagged and registered with the subscription component by the service interface component to receive realtime information.

5. The system of claim 1, wherein the realtime object includes a serialization plug-in that is adapted to publish updates from the webpage to the subscription component and a deserialization plug-in that is adapted to apply the realtime information received from the subscription component.

6. The system of claim 1, wherein the subscription component is also adapted to authenticate registration of a website that hosts the realtime webpage and entities allocated to realtime objects of realtime webpages of the website.

7. The system of claim 1, wherein the subscription component is also adapted to throttle subscriptions to realtime information and to throttle publish rates for realtime information.

8. The system of claim 1, wherein the subscription component is also adapted to provide the realtime information to other realtime objects based on a service level agreement.

9. A method of publishing realtime information to multiple realtime webpages, the method comprising:
   receiving, by a server computing device, registration requests from multiple realtime objects respectively included in multiple realtime webpages, the registration requests being for subscriptions to realtime information from a subscription component;
   mapping, by the server computing device, the multiple realtime objects to a subscription service entity;
   receiving the realtime information for publication to the multiple realtime objects; and
   publishing, by the server computing device, the realtime information to the multiple realtime objects based on the mappings.

10. The method of claim 9, wherein the registrations requests are received via service interface components included in the multiple realtime webpages.

11. The method of claim 9, further comprising processing registration requests to add and remove subscriptions for additional and to-be-removed realtime objects, the processing including adding and removing mappings between the additional and to-be-removed realtime objects and the entity at the subscription service.

12. The method of claim 11, further comprising:
   authenticating a registration of a website that hosts the webpage;
   throttling the processing of the registration requests to add subscriptions; and
   throttling the publishing of the realtime information to the multiple realtime objects.

13. A computer-readable device having computer-executable instructions stored therein, the computer-executable instructions including instructions for causing a computing device to perform operations, the operations comprising:
   receiving, by the computing device, registration requests from multiple realtime objects respectively included in multiple realtime webpages, the registration requests being for subscriptions to realtime information from a subscription component;
   mapping, by the computing device, the multiple realtime objects to a subscription service entity;
   receiving the realtime information for publication to the multiple realtime objects; and
   publishing, by server computing device, the realtime information to the multiple realtime objects based on the mappings.

14. The computer-readable device of claim 13, wherein the subscription component is adapted to map at least one of the multiple realtime objects of the realtime webpage to an entity of the subscription component and to provide the realtime information to the realtime object.

15. The computer-readable device of claim 13, wherein the realtime objects of the multiple realtime objects are individually tagged and registered with the subscription component to receive the realtime information.

16. The computer-readable device of claim 13, wherein at least one of the multiple realtime objects includes a serialization plug-in that is adapted to publish updates from a webpage to the subscription component and a deserialization plug-in that is adapted to apply the realtime information received from the subscription component.

17. The computer-readable device of claim 13, wherein the subscription component is adapted to authenticate registration of a website that hosts at least one of the realtime webpages.

18. The computer-readable device of claim 13, wherein the subscription component is adapted to throttle subscriptions to the realtime information and to throttle publish rates for the realtime information.

19. The computer-readable device of claim 13, wherein the subscription component is adapted to provide the realtime information to other realtime objects based on a service level agreement.

* * * * *